United States Patent
Seay

[15] 3,670,979
[45] June 20, 1972

[54] WEB HANDLING APPARATUS AND SPINDLE CHUCK THEREFOR

[72] Inventor: Philip B. Seay, Richmond, Va.
[73] Assignee: Inta-Roto, Inc., Richmond, Va.
[22] Filed: April 17, 1970
[21] Appl. No.: 29,476

[52] U.S. Cl. ........................................................ 242/64
[51] Int. Cl. ................................................... B65h 75/34
[58] Field of Search .................. 242/64, 68, 58, 68.1, 68.4, 242/56 A

[56] References Cited

UNITED STATES PATENTS

| | | | |
|---|---|---|---|
| 2,045,059 | 6/1936 | Tomlin | 242/64 X |
| 2,055,371 | 9/1936 | Wood | 242/64 |
| 3,421,709 | 1/1969 | Breacker et al. | 242/64 |
| 3,460,773 | 9/1969 | Breacker | 242/64 X |

Primary Examiner—Stanley N. Gilreath
Assistant Examiner—Gregory A. Walters
Attorney—Imirie and Smiley

[57] ABSTRACT

The spindle receiving chuck of a web handling apparatus comprises a holder of arcuate configuration and having a segmental gap therein which is wide enough to permit the passage of a spindle into and from the chuck. The interior of the holder body is spherical and a chuck assembly having a spherical outer surface is rotatably and swively mounted within the holder. The chuck assembly includes a U-shaped yoke and an arcuate segment pivotally connected at one of their respective ends and jointly defining a ring when their other respective ends are in abutment. A crank arm is secured to the ring for rotating it within the holder to move the segment into and from alignment with the segmental gap to permit loading and unloading a spindle, and locking the spindle within the ring. The web handling apparatus has pairs of arms with a spindle chuck carried by each arm to jointly support a spindle between said arms, said holders being positioned with their gaps on the upper sides of the arms in spindle loading position and means being provided to operate both chucks in each pair of arms simultaneously.

10 Claims, 8 Drawing Figures

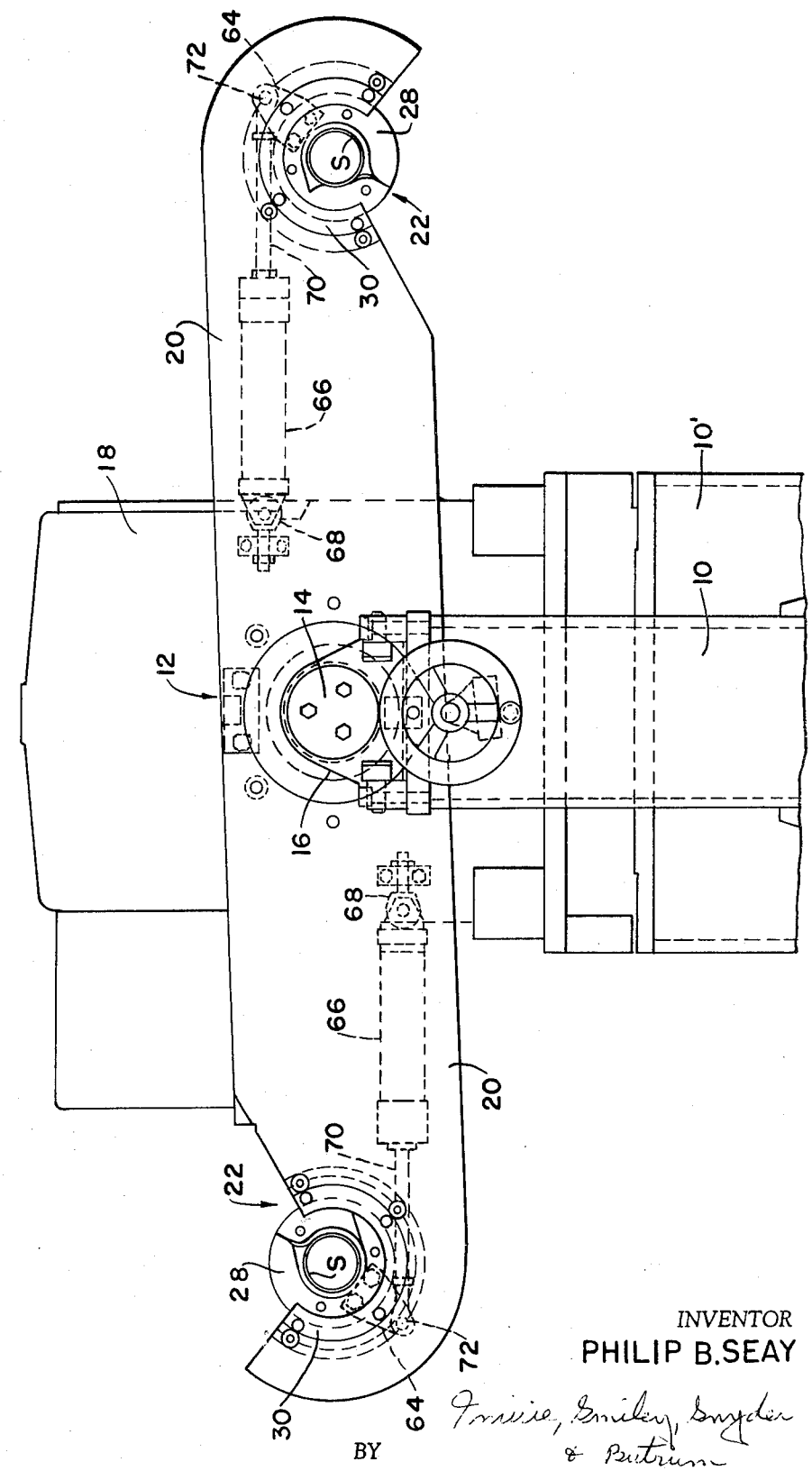

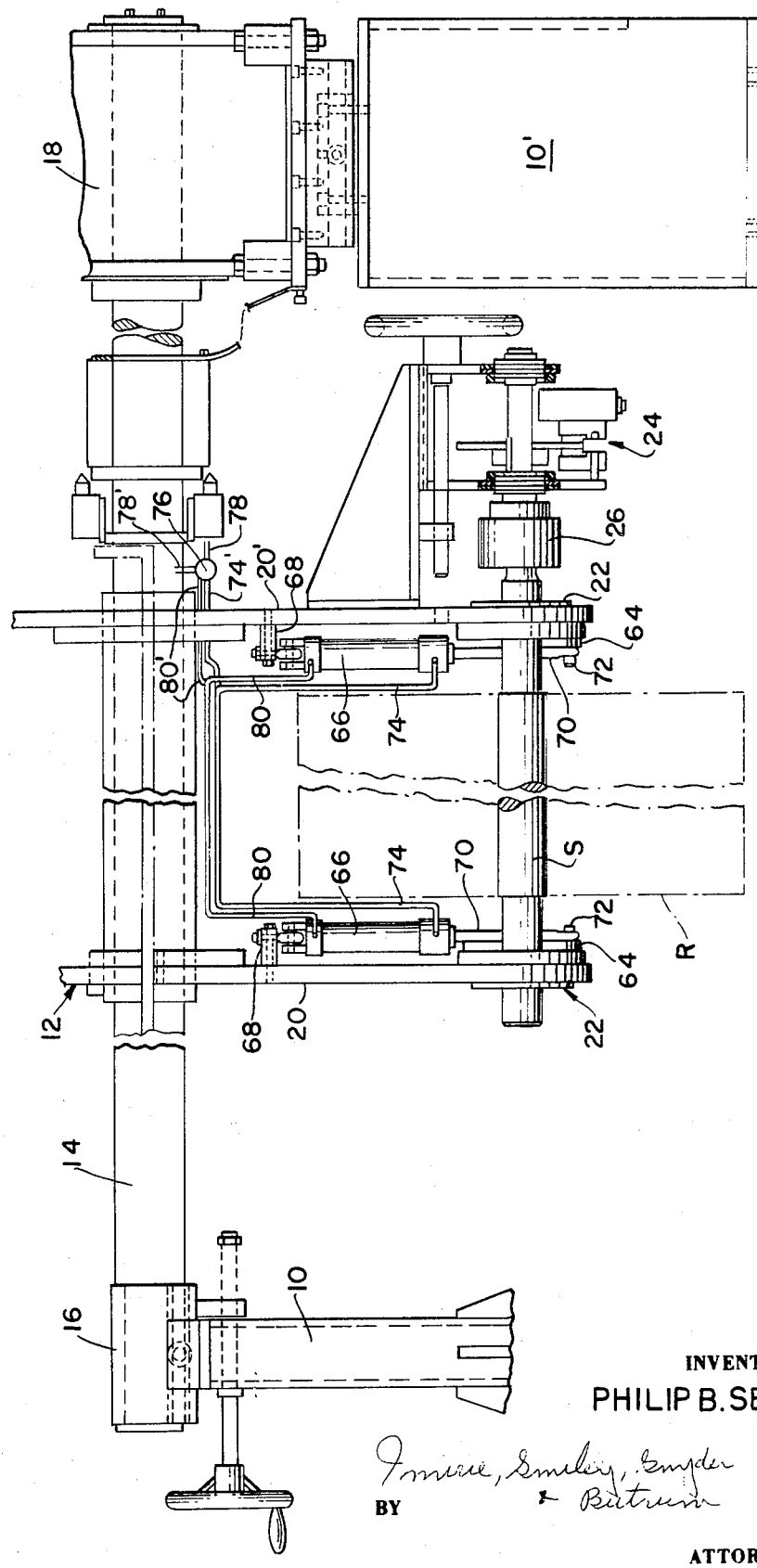

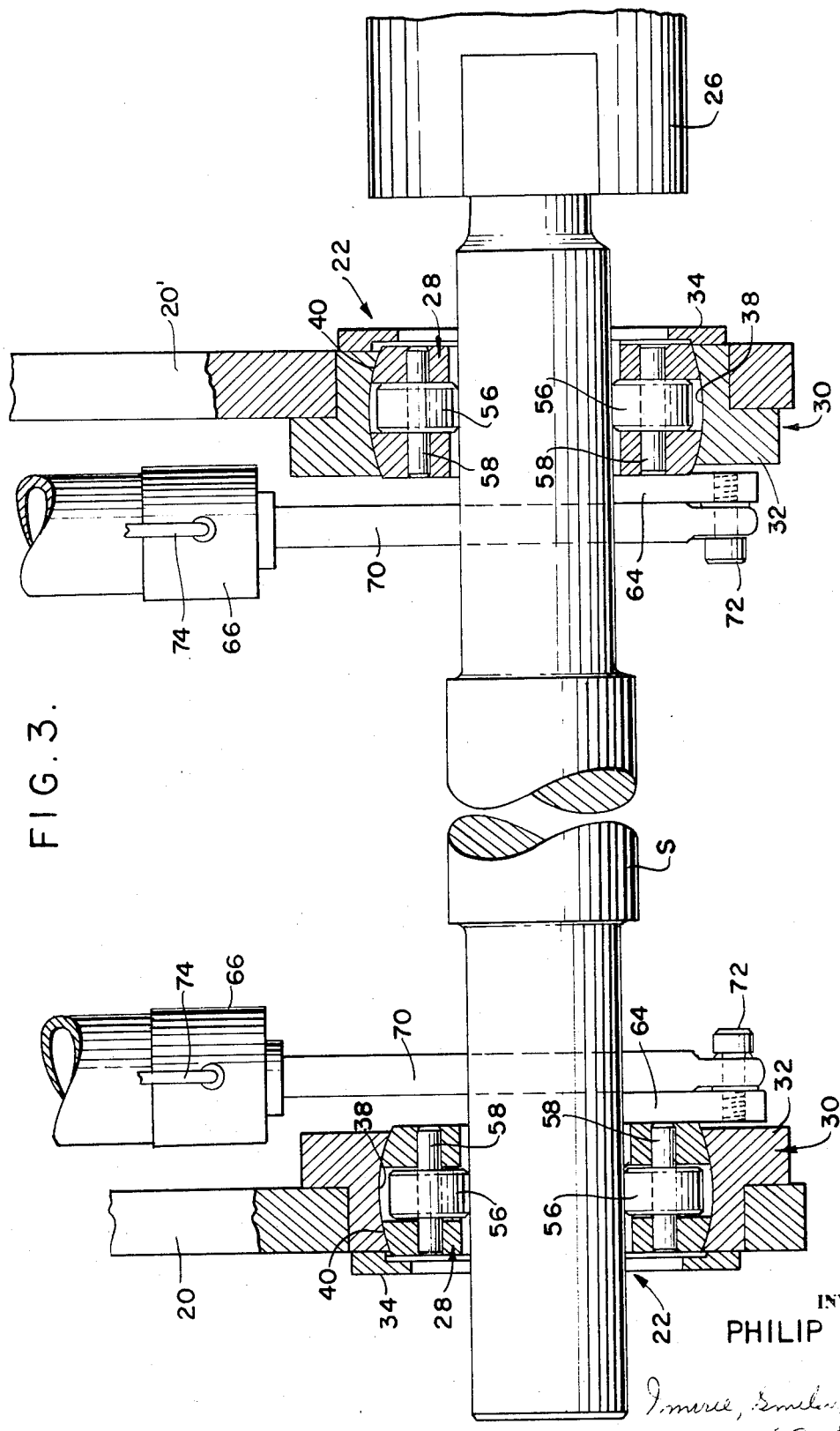

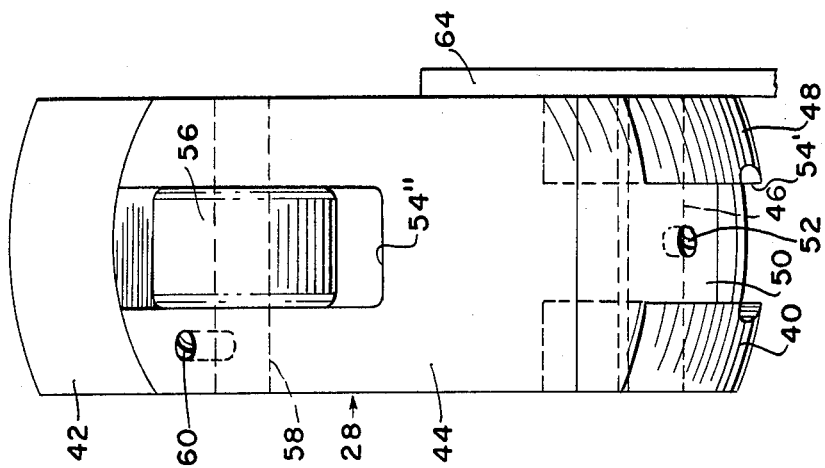
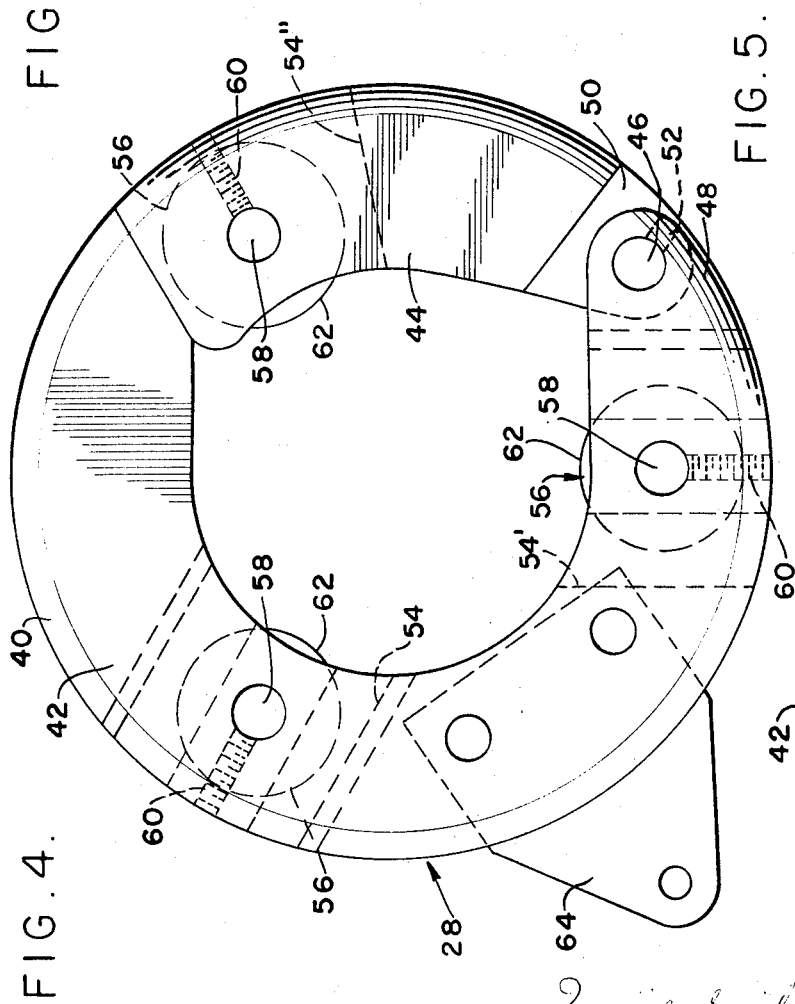
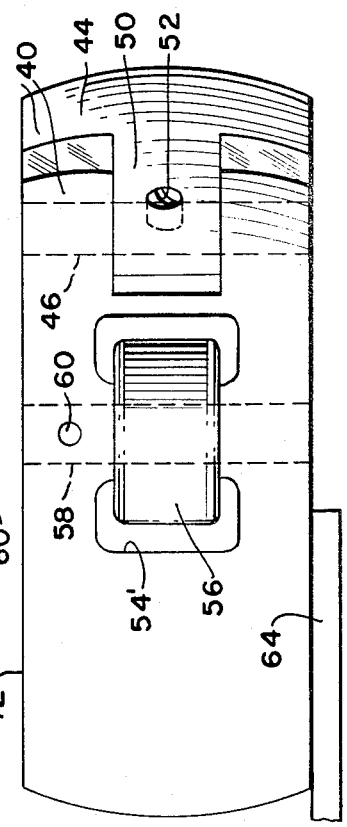

INVENTOR
PHILIP B. SEAY

ATTORNEYS

WEB HANDLING APPARATUS AND SPINDLE CHUCK THEREFOR

BACKGROUND OF THE INVENTION

Various types of web handling apparatus such as rewind and unwind stands usually comprise a turret supporting spaced pairs of radially disposed arms for carrying therebetween a spindle having a web rolled thereon. Normally, there are at least two counterbalancing pairs of such arms and sometimes more. At their ends, the arms are provided with chucks for removably receiving the spindles on which the web material is wound or unwound therefrom and normally these chucks comprise split rings including two semicircular segments having one of their ends pivotally connected together with a toggle bolt pivotally connected at the other end of one of the ring segments and a slot for removably receiving the bolt in the other or free end of the other segment. These chucks frequently cause difficulty due to the fact that the operator may not tighten the bolt sufficiently to retain the chuck in closed position so that during operation of the stand, and especially during rotation of the turret mechanism, a spindle occasionally will become dislodged and cause damage at least to the spindle if not the apparatus itself. Other types of chucks have been proposed but have been found wanting for various reasons.

BRIEF SUMMARY OF THE INVENTION

A spindle chuck in accordance with the invention includes a chuck assembly rotatably mounted in a ring-shaped holder having a segmental gap therein. The assembly comprises a yoke of circular outer configuration and a segment pivotally connected to said yoke at one of their adjoining ends and jointly defining a ring shaped bearing for removably supporting the journal of a spindle. The inner surface of the holder and the outer surface of the chuck assembly are of spherical configuration so that the chuck assembly may rotate and swivel slightly within the holder. A plurality of rollers are mounted within the chuck assembly, preferably two within the yoke and one within the segment, to define equispaced supports for a spindle journal. Crank means is connected to the chuck assembly, preferably the yoke, for rotating the assembly within the holder to move the segment into and from coincidence with the segmental gap in the holder to permit swinging the segment through the gap for mounting or dismounting a spindle journal, or to move the segment from the gap to lock the assembly in closed position. When mounted on the arms of a turret mechanism of a web handling apparatus, the holder is disposed so that its gap opens on the upper side of the respective arm at one station such as the loading station, depending upon the use of the apparatus.

BRIEF DESCRIPTION OF THE DRAWINGS

FIG. 1 is a side view in elevation of a web handling apparatus having two oppositely disposed pairs of arms for supporting spindles with chucks in accordance with the present invention in the end portions of the arms;

FIG. 2 is a fragmentary view in plan of one pair of arms as shown in FIG. 1;

FIG. 3 is an enlarged fragmentary view of the ends of one pair of arms showing the spindle chucks according to the present invention in cross-section;

FIG. 4 is an enlarged side view in elevation of the chuck assembly per se;

FIGS. 5 and 6 are edge views in elevation of the chuck assembly as viewed from the bottom and the right side of FIG. 4, respectively;

DETAILED DESCRIPTION OF THE INVENTION

Figure 7:
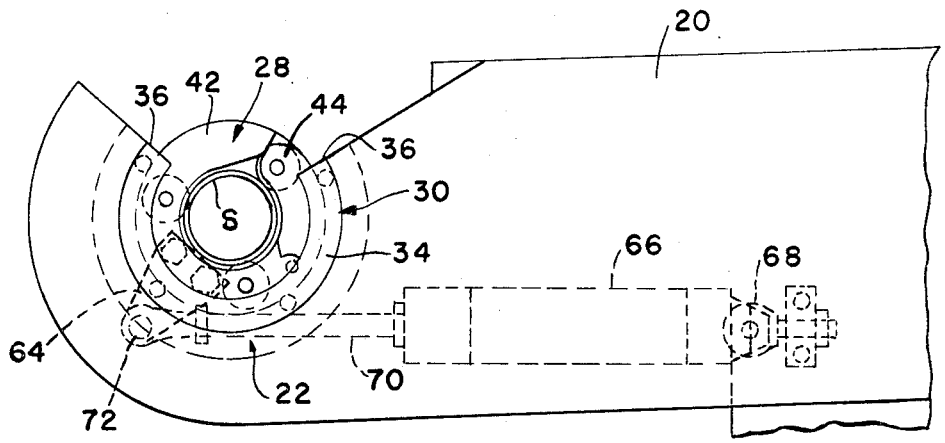
FIG. 7 is an enlarged fragmentary view of the end portion of an arm with the spindle chuck in closed position, and, FIG. 8 is a similar view of the arm at its opposite location and showing the chuck in open position.

Referring to the drawings in detail, and specifically to FIGS. 1 and 2, a typical web handling apparatus is shown as including a pair of upright standards or stantions, 10, 10' rotatably supporting a turret mechanism 12 which is mounted on a shaft 14 journalled in a bearing 16 on the standard 10 and rotatably supported and driven intermittently by a motor 18 mounted on the standard 10' for indexing the shaft 14. The turret mechanism 12 comprises radially disposed axially spaced arms 20, 20' which comprise pairs arranged in parallelism and usually equally spaced about the axis of the turret mechanism to counterbalance each other. In the present instance, the apparatus is shown as comprising two sets of said arms in diametrically disposed relationship. Each of the arms 20, 20' carries at its outer end a chuck mechanism 22 for removably receiving a spindle S adapted to carry a roll R of web material.

The chuck mechanisms 22 in each pair of arms 20, 20' are axially aligned for supporting a spindle S in parallelism with the axis of the turret supporting shaft 14. The present apparatus is shown as comprising an unwind unit and as such, includes a brake mechanism 24 and a clutch 26 to be releasably secured to each spindle at one end for creating sufficient drag to maintain the web in the roll R taut as it is paid therefrom. Obviously, in a rewind stand, the brake mechanism would have to be substituted for power means or the chucks would have to be slidably mounted on the arms to enable cooperation between the roll R and a driven platen drum in the usual manner.

Figure 8:
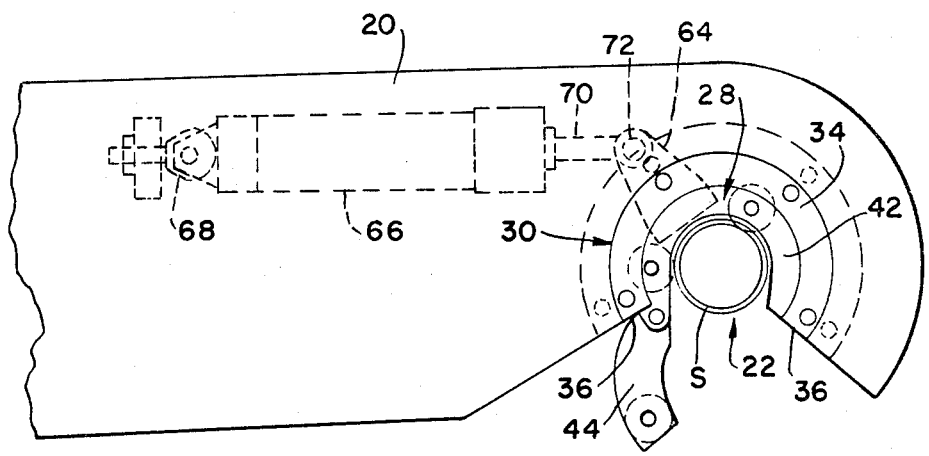

The described apparatus is typical of web handling apparatus now in use and the present invention resides in the construction and arrangement of the chuck mechanisms 22, which are best illustrated in addition to FIG. 1 in FIGS. 3–6. These chuck mechanisms comprise a chuck assembly 28 mounted within a holder 30, the latter comprising a body portion 32 and a retainer 34. As best shown in FIGS. 1, 7, and 8, the holder 30 is of a circular configuration having a segmental gap between the ends 36 thereof, this gap being of a dimension sufficient to pass a spindle S or its journal into and from the confines of the holder. The inner surface 38 of the holder body portion is spherical in configuration as best shown in FIG. 3 and the outer surface 40 of the chuck assembly 28 is likewise of spherical configuration and nests within the holder inner surface 38 so that it is capable of both rotary and swiveling action, the swiveling action being limited by the retainer 34.

The chuck assembly 28, as best seen in FIGS. 4–6, comprises a yoke 42 of U-shaped configuration with a circular outer dimension and a segment 44 pivotally connected at one end to one end of the yoke 42 by a pin 46, the opposite ends of the yoke and segment being adapted to abut each other to define a complete ring. The length of the segment and the span of the yoke is such that when the segment is pivoted to open position, a spindle may be placed in or removed from the yoke. For ease of construction and assembly the pivotally connected end 48 of the yoke 42 is bifurcated and the corresponding end of the segment 44 has a tongue extension 50 which fits closely but freely within the bifurcation 48. The bifurcation and tongue are provided with bores which when axially aligned receive a pivot pin 46 and the latter is secured in assembly by a set screw 52 threaded into the tongue 50.

Preferably, the chuck assembly 28 is adapted to constitute the equivalent of an anti-friction bearing and for this purpose is provided with a plurality of radially disposed slots 54, 54' and 54", within which are rotatably mounted rollers 56 journalled on stub shafts 58 mounted in bores extending transversely of the chuck assembly intermediate the length of the slots and secured by set screws 60, respectively. There may be any desired number of rollers 56 and they are so arranged that their peripheries 62 extend inwardly of the inner surface of the chuck assembly and jointly define the equivalent of an antifriction bearing. In the present instance, three rollers 56 are shown, two such rollers 56 being mounted in slots 54 and 54' in the yoke 42 and one roller 56 being mounted in slot 54'' in the free end of the segment 44. A crank arm 64 is fixed to and extends radially from the chuck assembly 28, the arm preferably being secured to the yoke 42.

As best shown in FIGS. 3, 7, and 8, the chuck assembly 28 is mounted within the holder 30 with the crank arm 64 extending radially of the chuck assembly and being operable to revolve the chuck assembly within the holder 30 in order to move the chuck assembly so as to align the segment 44 with the gap in the holder 30 to permit pivotal movement of the segment to open the chuck assembly, as shown in FIG. 8, and enable the positioning or withdrawal of a spindle S within the assembly, or as shown in FIG. 7, to revolve the assembly 28 until the segment 44 is within the confines of the holder 30 and thereby is trapped in locked position so that the assembly cannot accidentally open to permit the inadvertant dislodging of a spindle from the assembly. The spherical surfaces 38 and 40 enable a slight swiveling action of the chuck assembly 28 if the spindle S is slightly bent or tends to sag due to the weight of a roll R thereon.

The crank arm 64 can be operated manually or by any other suitable means, but in view of the fact that it is desirable that the two chuck assemblies in each pair of arms preferably are operated simultaneously to permit opening and/or closing of the assemblies at the same time, it is preferred that the crank arms be connected with and actuated by some means for operating the crank arms simultaneously. For this purpose, according to the present invention, a servo-motor 66 is pivotally mounted at one end by a universal-type connection 68 to the respective arm 20 or 20' and has a piston rod 70 extending from its opposite end and connected to the respective crank arm 64 by a pivot 72. Fluid pressure lines 74 are respectively connected to the servo-motors at one end thereof and extend to a joint supply pressure line 74' connected to a valve 76 which is also connected to a source 78 of fluid under pressure, and an exhaust 78'. Similar pressure lines 80 are connected between the opposite ends of the servo-motors 66 and a single pressure line 80' extending to the valve 76. Thus, upon operation of the valve 76, fluid pressure can be fed through the lines 80, 80' to expell the piston rods 70 and revolve the chuck assemblies 28 to lock the segments 44 in closed position, or, alternatively, the fluid can be fed to the lines 74, 74' to withdraw or force inwardly the piston rods 70 to revolve the chuck assemblies 28 to align the segments 44 with the gaps in the holders 30 and permit opening of the chuck assemblies.

In operation, the turret mechanism 12 can be disposed in the position shown in FIG. 1 with the chuck mechanisms 22 in the left hand arms 20, 20' opening through the upper sides of the arms. In this position, the valve 76 can be operated to supply pressure fluid through the lines 74, 74' to the servo-motors 66 to withdraw or retract the piston rods 70 in order to swing the crank arms 64 to revolve the chuck assemblies 28 to align the segments 44 thereof with the gaps in the holders 30, as shown in FIG. 8, the lines 80, 80' being connected to exhaust 78'. The segments 44 can then be swung open and if a spindle S is mounted within the chucks, it can be removed and a fresh spindle deposited therein. The valve 76 is then operated to exhaust fluid from the lines 74, 74' to exhaust 78' and supply pressure fluid to the lines 80, 80' to expell the piston rods 70 to swing the crank arms 64 to revolve the chuck assemblies within the holders 30 and thereby trap the segments 44 in locked position. Upon completion of the winding operation, or prior to the end thereof, the turret mechanism 12 may be indexed to swing the arms 20, 20' to their opposite positions so that the chuck mechanisms 22 and the spindle S supported thereby which previously were in the left hand position of FIG. 1 are swung to the right hand position of FIG. 1. In this latter position, if desired, the chuck assemblies can be revolved to open position as shown in FIG. 8 to enable lowering the spindle S onto a dolly or other suitable mobile carriage for removing the spindle and any web material wound thereon.

The operation as above-described is not that followed in the machine that is illustrated as an unwind stand except that a spindle S with a roll R of web material wound thereon is loaded in the chuck mechanisms 22 at the left hand end of the arms 20, 20' and the web is unwound therefrom to be rewound or further treated through another apparatus. Before the web is completely unwound from the spindle S, the turret mechanism 12 is indexed to swing the arms to opposite relative position in which event the spindle and roll being unwound, is swung over to the right hand position and the spindle in the chuck mechanisms 22 which previously were in the right hand position are swung to the left hand position whereupon the chuck mechanisms are opened, the spindle S mounted therein is removed, and a new spindle S with a fresh roll R thereon is mounted in the chuck mechanisms which are then locked. During this time, the web that is being removed from a roll that has been swung to the right hand position has been continuously removed so that has been swung to the right hand position has been continuously removed so that as it approaches the end of the web, such web may be spliced to the web carried by the fresh spindle that has just been mounted in the left hand chuck mechanism 22.

The pivotally mounted end 50 of the chuck segment 44 is so oriented relative to the holder 30 and its direction of movement relative to said holder is such that when the chuck assembly 28 is moved from open position, wherein the segment is coincident with the holder gap, to locked position, said end 50 constitutes the leading end of the segment so that the segment is forced inwardly by engagement with the holder to locked position. Thus, the free end of the segment cannot block movement of the chuck assembly toward locked position.

I claim:
1. A spindle chuck comprising:
   a chuck assembly including a yoke having a circular periphery and a generally U-shaped radially disposed slot opening through said periphery and of a width at least equal to the diameter of the journal of a spindle to be supported, a segment of a dimension to span said slot opening, and means pivotally connecting one of the respective ends of said yoke and said segment so that when the other of their respective ends are in abutment they jointly form a ring defining a bearing for the journal of a spindle;
   a ring shaped holder body having a circular inner surface and a segmental gap of a size at least equal to that of said segment and to the diameter of the journal of a spindle to be supported;
   said chuck assembly having a circular periphery mating with and rotatably mounted in the inner surface of said holder body, and
   crank means secured to said chuck assembly for rotatably moving the latter within said body between a position in which said chuck segment is coincident with said gap and free to swing outwardly through said gap to pass a spindle journal, and a position beyond said gap to be trapped in closed position by said body to retain a spindle journal within the bearing defined by said assembly.

2. A chuck according to claim 1 comprising:
   a plurality of rollers journaled in said chuck assembly with their peripheries extending inwardly of said assembly and constituting the bearing for the journal of a spindle.

3. A chuck according to claim 2 comprising:
   three said rollers equispaced about said chuck assembly, one said roller journaled in said segment and two said rollers journaled in said yoke.

4. A chuck according to claim 3 wherein:
   the inner surface of said holder body is spherical, and
   the periphery of said chuck assembly is spherical and in mating relation with said body inner surface to accommodate swivelling action therebetween when the axis of a spindle is not perpendicular to the plane of said holder body.

5. A chuck according to claim 4 wherein said crank means comprises a crank arm fixed to said yoke.

6. A chuck according to claim 1 wherein:
the inner surface of said holder body is spherical, and
the periphery of said chuck assembly is spherical and in mating relation with said body inner surface to accommodate swivelling action therebetween when the axis of a spindle is not perpendicular to the plane of said holder body.

7. A chuck according to claim 1 wherein said crank means comprises a crank arm fixed to said yoke.

8. A stand for winding or unwinding web strip material, comprising:
a base,
a turret mechanism rotatably supported by said base and including a plurality of pairs of axially spaced arms extending therefrom,
a spindle chuck carried by each said arm with the chucks on each pair of arms in substantially axial alignment for jointly supporting a spindle,
each said chuck including
a chuck assembly including a yoke having a circular periphery and a generally U-shaped radially disposed slot opening through said periphery and of a width at least equal to the diameter of the journal of a spindle to be supported, a segment of a dimension to span said slot opening, and means pivotally connecting one of the respective ends of said yoke and said segment so that when the other of their respective ends are in abutment they jointly form a ring defining a bearing for the journal of a spindle;
a ring shaped holder body having a circular inner surface and a segmental gap of a size at least equal to that of said segment and to the diameter of the journal of a spindle to be supported;
said chuck assembly having a circular periphery mating with and rotatably mounted in the inner surface of said holder body,
crank means secured to said chuck assembly for rotatably moving the latter within said body between a position in which said chuck segment is coincident with said gap and free to swing outwardly through said gap to pass a spindle journal, and a position beyond said gap to be trapped in closed position by said body to retain a spindle journal within the bearing defined by said assembly,
and means on said base for indexing said turret mechanism to move said pairs of arms to selected positions about the axis of said turret mechanism,
said spindle chucks being uniformly positioned on said arms so that the gaps in said holder bodies are disposed on the same relative sides of said arms and open through the upper side of said arms in the loading position.

9. A stand according to claim 8 comprising:
means connected with the crank means of the chuck assemblies carried by each pair of arms for operating said chuck assemblies simultaneously.

10. A stand according to claim 9 wherein:
said means for operating said chuck assemblies simultaneously, comprises a servo-motor connected between each arm and the crank means of the chuck assembly carried thereby,
and fluid pressure means connected with the servo-motors of each pair of arms for actuating said servo-motors simultaneously.

* * * * *